US008834777B2

(12) United States Patent
Simon et al.

(10) Patent No.: US 8,834,777 B2
(45) Date of Patent: Sep. 16, 2014

(54) USE OF POLYESTER POWDER IN A SHAPING PROCESS, AND MOLDINGS PRODUCED FROM THIS POLYESTER POWDER

(75) Inventors: Ulrich Simon, Herne (DE); Sylvia Monsheimer, Haltern am See (DE); Maik Grebe, Bochum (DE); Heinrich Temme, Dülmen (DE)

(73) Assignee: Evonik Degussa GmbH, Essen (DE)

( * ) Notice: Subject to any disclaimer, the term of this patent is extended or adjusted under 35 U.S.C. 154(b) by 1819 days.

(21) Appl. No.: 11/561,021

(22) Filed: Nov. 17, 2006

(65) Prior Publication Data

US 2007/0126159 A1 Jun. 7, 2007

(30) Foreign Application Priority Data

Nov. 17, 2005 (DE) .......................... 10 2005 054 723

(51) Int. Cl.
*B29C 35/08* (2006.01)
*B29C 41/02* (2006.01)
*B29C 71/04* (2006.01)
*B29C 67/00* (2006.01)
*B29K 67/00* (2006.01)

(52) U.S. Cl.
CPC ......... *B29C 67/0077* (2013.01); *B29K 2067/00* (2013.01)
USPC ....................................... 264/497

(58) Field of Classification Search
USPC ......................... 264/113, 460, 497
See application file for complete search history.

(56) References Cited

U.S. PATENT DOCUMENTS

| | | | |
|---|---|---|---|
| 5,425,817 A | 6/1995 | Mugge et al. | |
| 6,589,471 B1 * | 7/2003 | Khoshnevis | 264/497 |
| 6,884,485 B2 | 4/2005 | Baumann et al. | |
| 7,135,525 B2 | 11/2006 | Petter et al. | |
| 7,211,615 B2 | 5/2007 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0138363 A1 | 7/2004 | Baumann et al. | |
| 2004/0140668 A1 | 7/2004 | Monsheimer et al. | |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2006/0071359 A1 | 4/2006 | Monsheimer et al. | |
| 2006/0134419 A1 | 6/2006 | Monsheimer et al. | |
| 2006/0182916 A1 | 8/2006 | Dowe et al. | |
| 2006/0183869 A1 | 8/2006 | Dowe et al. | |
| 2006/0189784 A1 | 8/2006 | Monsheimer et al. | |
| 2006/0202395 A1 | 9/2006 | Monsheimer et al. | |
| 2006/0223928 A1 | 10/2006 | Monsheimer et al. | |
| 2006/0244169 A1 | 11/2006 | Monsheimer et al. | |
| 2006/0281873 A1 | 12/2006 | Alting et al. | |
| 2007/0055044 A1 | 3/2007 | Simon et al. | |
| 2007/0088114 A1 * | 4/2007 | Asgari | 524/431 |
| 2007/0104971 A1 | 5/2007 | Wursche et al. | |
| 2007/0166560 A1 | 7/2007 | Wursche et al. | |
| 2007/0260014 A1 | 11/2007 | Simon et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0217821 A1 | 9/2008 | Goring et al. | |
| 2008/0242782 A1 | 10/2008 | Hager et al. | |
| 2008/0249237 A1 | 10/2008 | Hager et al. | |
| 2009/0088508 A1 | 4/2009 | Monsheimer et al. | |

OTHER PUBLICATIONS

U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 12/105,672, filed Apr. 18, 2008, Simon, et al.
U.S. Appl. No. 60/831,222, filed Jul. 17, 2006, Hager, et al.
U.S. Appl. No. 12/407,065, filed Mar. 19, 2009, Monsheimer, et al.
U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/484,593, filed Jul. 12, 2006, Monsheimer, et al.
U.S. Appl. No. 11/587,795, filed Oct. 27, 2006, Monsheimer, et al.
U.S. Appl. No. 11/587,758, filed Oct. 27, 2006, Baumann, et al.
U.S. Appl. No. 11/596,365, filed Nov. 14, 2006, Monsheimer, et al.
U.S. Appl. No. 12/989,899, filed Oct. 27, 2010, Wurshche, et al.

* cited by examiner

*Primary Examiner* — Leo B Tentoni
(74) *Attorney, Agent, or Firm* — Oblon, Spivak, McClelland, Maier & Neustadt, L.L.P.

(57) ABSTRACT

The present invention relates to the use of a powder which comprises specific polyesters for shaping processes, and to moldings produced powder. The shaping processes are layer-by-layer processes which use powder, which comprises selectively melting regions of a powder layer by applying electromagnetic energy. Selectivity can although there is no intention to restrict the invention thereto be achieved via a mask, or application of an inhibitor, of an absorber or of a susceptor, or via focusing of the energy input. After cooling, the regions then solidified can be removed as moldings from the powder bed. The process occurs by using a polyester powder obtained from an alcohol and from a diacid with no use of any aromatic monomer unit. These polyester powders combine high crystallinity and low melting point, and makes the construction process more reliable while good component quality, mechanical properties, density, dimensional accuracy, and low shrinkage are realized.

17 Claims, No Drawings

USE OF POLYESTER POWDER IN A SHAPING PROCESS, AND MOLDINGS PRODUCED FROM THIS POLYESTER POWDER

BACKGROUND OF THE INVENTION

1. Field of the Invention

Rapid production of prototypes is a task often encountered in very recent times. Particularly suitable processes are those whose operation is based on pulverulent materials and which produce the desired structures layer-by-layer via selective melting and hardening. Support structures for overhangs and undercuts can be avoided in these processes, because the powder bed surrounding the molten regions provides adequate support. Nor is there any need for subsequent operations to remove supports. These processes are also suitable for short-run production.

The invention relates to the use, in shaping processes, of a polyester powder which was prepared from a di- or polyhydric alcohol and from a dicarboxylic acid, while avoiding any aromatic monomer unit, and also to moldings produced via a layer-by-layer process by which regions of a powder layer are selectively melted, using this powder. After cooling and hardening of the regions previously melted layer-by-layer, the molding can be removed from the powder bed.

Selectivity of these layer-by-layer processes can by way of example be achieved by way of application of a susceptor, of an absorber, or of an inhibitor, or via a mask, or by way of focused introduction of energy, for example via a laser beam, or by way of glass fibers. Energy input is achieved by way of electromagnetic radiation.

There follows a description of some processes which, with the inventive use of a polyester powder, can produce inventive moldings, but there is no intention that the invention be restricted thereto.

2. Discussion of the Background

One process which has particularly good suitability for the purposes of rapid prototyping is selective laser sintering. This process irradiates plastics powders selectively and briefly with a laser beam in a chamber, the result being that the powder particles impacted by the laser beam melt. The molten particles coalesce and rapidly solidify again to give a solid mass. This process can produce three-dimensional products simply and rapidly via repeated irradiation of a succession of freshly applied layers.

The process of laser sintering, i.e., rapid prototyping, for production of moldings from pulverulent polymers is disclosed in U.S. Pat. No. 6,136,948 from DTM Corporation. A wide variety of polymers and copolymers is disclosed, examples being polyacetate, polypropylene, polyethylene, ionomers, and polyamide.

Other processes with good suitability are the selective inhibition of bonding (SIB) process as disclosed in U.S. Pat. No. 6,589,471 or a process disclosed in U.S. Pat. No. 6,531,086. Both processes operate with full-surface infrared heating to melt the powder. Selectivity of melting is achieved in the first process via application of an inhibitor, and in the second process via a mask. US 2004/232583 discloses another process, in which the energy needed for melting is introduced via a microwave generator, and selectivity is achieved via application of a susceptor.

Other suitable processes are those which operate with an absorber, which is either present in the powder or is applied via ink jet methods, as described in DE 10 2004 012 682.8, DE 10 2004 012 683.6, and DE 10 2004 020 452.7.

The rapid prototyping or rapid manufacturing processes mentioned (RP or RM processes) can use pulverulent substrates, in particular polymers, preferably selected from polyester, polyvinyl chloride, polyacetal, polypropylene, polyethylene, polystyrene, polycarbonate, poly(N-methylmethacrylimides) (PMMI), polymethylmethacrylate (PMMA), ionomer, polyamide, or a mixture thereof.

U.S. Pat. No. 5,342,919 discloses a polymer powder suitable for laser sintering which exhibits no overlap of the melting and recrystallization peak when melting behavior is determined via differential scanning calorimetry at a scanning rate of from 10 to 20° C./min, and which has a degree of crystallinity of from 10 to 90%, likewise determined via DSC, and has a number-average molecular weight Mn of from 30 000 to 500 000, its Mw/Mn quotient being in the range from 1 to 5.

U.S. Pat. No. 6,245,281 discloses the use of a nylon-12 powder with increased melting point and increased enthalpy of fusion, obtained via reprecipitation of a polyamide previously prepared via ring-opening and subsequent polycondensation of laurolactam. This is a nylon-12.

DE 10 2004 010 160 A1 describes the use of polymer powder with copolymer in shaping processes. These are thermoplastic random copolymers composed of a very wide variety of monomer units, the emphasis here being placed on laurolactam-based systems. Monomers are mentioned by way of example for copolyesters, but no details are given of specific constitutions. The melt flow rate (MFR) value of the copolymers is from 1 to 10 g/10 min.

One processing disadvantage is that in order to avoid what is known as curl the temperature in the construction space or construction chamber has to be kept with maximum uniformity at a level just below the melting point of the polymeric material. In the case of amorphous polymers, this means a temperature just below the glass transition temperature, and in the case of semicrystalline polymers this means a temperature just below the crystallite melting point. Curl means distortion of the region after melting, the result being at least some protrusion out of the construction plane. There is an associated risk that when the next powder layer is applied, for example via a doctor or a roller, the protruding regions may be shifted or even entirely broken away. The consequence of this for the process is that the overall construction space temperature has to be kept at a relatively high level, and that the volume change brought about via cooling and via crystallization of the moldings produced by these processes is considerable. Another important factor is that the period required for cooling is significant, especially for "rapid" processes.

Another disadvantage of the semicrystalline thermoplastics in many instances is their crystallinity, and the volume change caused thereby during cooling from the melt. Although it is possible to use very complicated and precise temperature control to achieve a substantial equalization of the volume change due to the crystallinity of an individual layer, the volume change due to crystallization in three-dimensional moldings of any desired structure is not uniform throughout the molding. By way of example, the formation of crystalline structures is dependent on the cooling rate of the molding, and at locations of different thickness or at angled locations this rate differs from that at other locations within the molding.

A disadvantage of amorphous thermoplastics is high viscosity, permitting coalescence only markedly above the melting point or the glass transition temperature. Moldings produced by the above processes using amorphous thermoplastics are therefore very often relatively porous; the process merely forms sinter necks, and the individual powder particles remain discernible within the molding. However, if the amount of energy introduced is increased in order to reduce viscosity there is the additional problem of dimensional accuracy; by way of example, the contours of the molding lose sharpness as a result of heat conducted from the melting regions into the surrounding regions.

One disadvantage of the copolymers previously disclosed in the literature for use in moldless shaping processes is that although melting points can be lowered by means of altering the composition with a resultant favorable effect on processing and on shrinkage. In particular, this is accomplished specifically by usage of at least one aromatic monomer unit, which results in a reduction in the crystallinity, with the result that the crystallite melting point then is not a measure of the transition from a solid to a liquid, but instead, it is substantially a measure of the glass transition, the transition being gradual and dependent on the constitutions of the copolymers. The aromatic monomer unit can be terephthalic acid or isophthalic acid, for example. However, a contrary effect is that these aromatic components markedly increase the viscosity of the melt, making coalescence of the powder particles more difficult. Therefore, a compromise always has to be found between competing targeted properties. The melting points of the homopolymers mainly used at present are above 160° C., examples being nylon-12 (melting point: 186° C.) and nylon-11 (melting point: 193° C.). A disadvantage here is that more curl arises and can even prevent processing, and that the requirements placed upon the machine are very much more stringent because uniformity of temperature in the construction area has to be maximized, and specifically at a level just below the melting point of the polymer.

BRIEF SUMMARY OF THE INVENTION

It is therefore an object of the present invention to permit the use, in moldless shaping processes, of a polymer powder which combines the contradictory properties of low melting point and low viscosity. A reduction in molecular weight is not a suitable method here for adjusting the viscosity, because that measure would lead to poorer mechanical properties. The processing method is a layer-by-layer process in which regions of the respective powder layer are selectively melted by means of electromagnetic energy, and, after cooling, have bonded to give the desired molding.

Surprisingly, it has now been found that when polyester powder which is prepared from an aliphatic alcohol and from an aliphatic dicarboxylic acid, while avoiding any aromatic monomer unit, is used in a layer-by-layer process in which regions of the respective powder layer are selectively melted, it is possible to utilize very low polymer viscosity despite processing at low temperatures in the construction chamber. A consequence of this is high component densities and high dimensional accuracy, together with easy processing and very low shrinkage.

DETAILED DESCRIPTION OF THE INVENTION

The present invention therefore provides the use of polymer powder in a moldless layer-by-layer shaping process in which regions of the respective layer are selectively melted, the use being characterized in that the powder comprises at least one polyester which was prepared from a di- or polyhydric alcohol and from a dicarboxylic acid, while avoiding any aromatic monomer unit.

A diol having not more than 10 carbon units, and particularly preferably a diol having not more than 6 carbon units, and very particularly preferably butanediol, is preferably used as monomer unit for the polyester powder in the inventive use.

A diacid having from 4 to 18 carbon atoms, particularly preferably from 4 to 12, and very particularly preferably from 6 to 8, is also preferred as monomer unit for the polyester powder in the inventive use.

However, no aromatic structure is ever used in preparation of the polyester powder. That is, the polyester does not contain an aromatic monomer or aromatic functionality in the polyester chain.

The present invention also provides moldings produced via a layer-by-layer process in which the regions of the respective layer are selectively melted via input of electromagnetic energy, the moldings being characterized in that they comprise a polyester which was prepared from a di- or polyhydric alcohol and from a dicarboxylic acid, while avoiding any aromatic monomer unit.

A diol having not more than 10 carbon units, and particularly preferably a diol having not more than 6 carbon units, and very particularly preferably butanediol, is preferably used as monomer unit for the polyester powder in the inventive use.

A diacid having from 4 to 18 carbon atoms, particularly preferably from 4 to 12, and very particularly preferably from 6 to 8, is also preferred as monomer unit for the polyester powder in the inventive use.

However, no aromatic structure is ever used in preparation of the polyester powder.

A description follows of the polymer powder and also of its inventive use, but there is no intention that the invention be restricted thereto.

Surprisingly, the use of the specific polyester in the inventive process finds room for maneuver between the competing properties described above. Standard poly- or copolyesters are generally prepared from at least one aromatic monomer. The use of a di- or polyhydric alcohol and of a dicarboxylic acid, while avoiding any aromatic monomer component, leads to a polyester with very specific properties. A melting point of from 60° C. to 150° C. in the polyester has high crystallinity is an unusual combination of properties which has a surprisingly positive effect on the inventive process.

The polyester involved is of type II, and accordingly is prepared from at least two different components, namely from an at least dihydric alcohol and from a dicarboxylic acid. The polyester for use in the inventive process is prepared via polycondensation of a di- or polyhydric alcohol and of a diacid, while avoiding any aromatic monomer unit. The ratio of the two components described, alcohol and acid, is about 1 to 1, preferably 1:1, in which the two components are equimolar. However, in another advantageous embodiment, one of the components is used in excess for controlled adjustment of the functionality of the polyester. This is therefore a homopolyester.

The alcohol here can be di- or polyhydric. The use of a polyhydric alcohol leads to crosslinked structures in the polyester. The arrangement of the hydroxy groups in the monomer unit for the alcohol can be primary (terminal), secondary, or tertiary, preferably primary or secondary; however, there can also be a mixed arrangement. For example the arrangement of the hydroxyl groups in the monomer can be composed of one or two primary hydroxy groups and of one or more secondary hydroxy groups. Isomer mixtures may also be mentioned expressly here. A diol having not more than 10 carbon units, and particularly preferably a diol having not more than 6 carbon units, and very particularly preferably butanediol, is preferred as a monomer unit for the alcohol for the polyester powder in the inventive use. In another embodiment, a polyglycol is used as monomer unit for the alcohol, its weight-average molar mass preferably being from 400 g/mol to 2000 g/mol, particularly preferably from 400 g/mol to 800 g/mol.

The linear saturated diacid has from 4 to 18 carbon atoms in its chain; known representatives of this group are malonic acid (propanedioic acid), succinic acid (butanedioic acid), glutaric acid (pentanedioic acid), adipic acid (hexanedioic acid), pimelic acid (heptanedioic acid), azelaic acid (nonanedioic acid), sebacic acid (decanedioic acid), dodecanedioic acid, brassylic acid (tridecanedioic acid), tetradecanedioic acid, pentadecanedioic acid, and octadecanedioic acid. For the use in the inventive process, preference is given to a polyester which was prepared from at least one diol and from at least one saturated diacid having from 4 to 12 carbon atoms in its chain, and which has no aromatic monomer unit. For use in the inventive process, very particular preference is given to a polyester which was prepared from at least one diol and from at least one saturated diacid having from 6 to 8 carbon atoms in its chain, and which has no aromatic monomer unit. Another possible embodiment uses functional derivatives of the dicarboxylic acids, e.g., mono-anhydride, di-anhydride, mono-chloride, di-chloride, and/or mixtures thereof, in order to prepare polyesters for use in the inventive process.

Surprisingly, the inventive use of the polyester powder leads to good process properties and also to good component properties. The compromise described above between different targeted properties is circumvented, giving access to a completely new process sector with surprising possibilities which will be explained below. The ISO 1133 (21.6N) MFR values of the polyesters used in an inventive process are preferably from 50 g/10 min to 500 g/10 min, particularly preferably from 100 g/10 min to 300 g/10 min. The melting point, determined via DSC (differential scanning calorimetry) to DIN 53765, of the polyesters used in the inventive process is moreover preferably from 60° C. to 150° C., preferably from 70° C. to 120° C., and very particularly preferably from 60° C. to 100° C. It is preferable that a main peak is detected during DSC melting. These are highly crystalline polyesters. The various parameters were determined by means of DSC (differential scanning calorimetry) to DIN 53765 or to AN-SAA 0663. The measurements were made using a Perkin Elmer DSC 7 with nitrogen as flushing gas and with a heating rate and cooling rate of 20 K/min. The measurement range was from −90 C to +250° C.

Viscosity is sufficiently low to give a very smooth melt film in the construction chamber with moderate preheating to just below the melting point. The good melt flow leads to moldings whose density is close to the density of components injection-molded from the corresponding material. The crystallinity leads to good demarcation between the regions melted via selective energy input and the regions not melted. Energy input can be matched to the melt flow needed in such a way to avoid occurrence of any undesired "growth" of the moldings outside the intended profile, for example via conducted heat. The use of the polyester powder in the inventive process is unproblematic and readily permits automation.

The person skilled in the art can easily discover the remaining parameters for optimized processing. By way of example, it is advantageous to introduce relatively little energy per unit of volume when comparison is made with the current standard materials PA11 and PA12.

If a laser is used, this can be achieved simply by reducing the power of the laser. Other optimization possibilities which may be mentioned are the layer thickness and the period of exposure to energy, but the list of examples is not intended to restrict the possibilities.

The intrinsic color of the inventive moldings produced by an inventive process is moreover white. The polyesters for use in the inventive process, and the inventive moldings, are biocompatible, and this represents a further advantage.

The polyesters are prepared via polycondensation according to the prior art. The polyester pellets are then milled at low temperatures, for example at −30° C., in an impact or pinned-disk mill under liquid nitrogen, in order to obtain pulverulent particles for use in the inventive process. At least one precautionary sieving to remove very coarse particles should then be carried out. Subsequent fractionation is mostly advisable. The grain size range of the polyester powders is preferably from 1 µm to 150 µm, preferably from 1 µm to 120 µm. The grain size distribution here remains relatively broad. Typical values for the D90/D10 ratio are from 1:2 to 1:15, preferably from 1:3 to 1:5. Mechanical post-treatment, for example in a high-speed mixer, for rounding of the sharp-edged particles produced during the grinding process, and thus giving easier application of relatively thin layers, can likewise be advisable. The BET surface area of the inventive polyester powder is smaller than 15 m$^2$/g, preferably smaller than 10 m$^2$/g, and particularly preferably smaller than 5 m$^2$/g. The median grain diameter is preferably from 40 µm to 120 µm, preferably from 45 µm to 100 µm, and particularly preferably from 50 µm to 70 µm.

Polyester powders for use in the inventive process can moreover comprise auxiliaries and/or fillers and/or further organic or inorganic pigments. These auxiliaries can, by way of example, be powder-flow aids, e.g., precipitated and/or fumed silicas. Precipitated silicas are supplied by way of example with the product name Aerosil, with various specifications, by Degussa AG. Polymer powder preferably comprises less than 3% by weight, preferably from 0.001% by weight to 2% by weight, and very particularly preferably from 0.05% by weight to 1% by weight, of these auxiliaries, based on the entirety of the polymers present. By way of example, the fillers can be glass particles, metal particles, or ceramic particles, e.g., glass beads, steel shot, or granulated metal, or foreign pigments, e.g., transition metal oxides. They can also be hollow. By way of example, the pigments can be titanium dioxide particles based on rutile (preferably) or anatase, or carbon black particles. Mention may also be made here of the use of carbon fibers, which may have been ground.

The median size of these filler particles is preferably smaller than or approximately equal to the size of the particles of the polyester. The extent to which the median particle size $d_{50}$ of the fillers is less than the median particle size $d_{50}$ of the polyester is preferably not more than 20%, preferably not more than 15%, and very particularly preferably not more than 5%. A particular limit on the particle size is given by the permissible overall height or, respectively, layer thickness in the rapid prototyping/rapid manufacturing system.

The polymer powder preferably comprises less than 75% by weight, with preference from 0.001% by weight to 70% by weight, with particular preference from 0.05% by weight to 50% by weight, and with very particular preference from 0.5% by weight to 25% by weight, of these fillers, based on the entirety of the polyesters present.

If the stated maximum limits for auxiliaries and/or fillers are exceeded, there can, as a function of the filler or auxiliary used, be marked impairment of the mechanical properties of moldings produced by means of these polymer powders.

It is also possible to mix conventional polymer powders with inventive polymer powders. This method can prepare polymer powders with a different combination of surface properties. The process for preparation of these mixtures can be found by way of example in U.S. Pat. No. 4,661,585.

In order to improve melt flow during production of the moldings, a flow agent can be added to the polymer powder, examples being metal soaps, preferably the alkali metal or alkaline earth metal salts of the underlying alkanemonocarboxylic acids or dimer acids. The metal soap particles can be incorporated into the polymer particles, or else mixtures of fine-particle metal soaps and polymer particles can be used.

The amounts used of the metal soaps are from 0.01% by weight to 30% by weight, preferably from 0.5% by weight to 15% by weight, based on the entirety of the polymers present in the powder. Preferred metal soaps used are the sodium or calcium salts of the underlying alkanemonocarboxylic acids or dimer acids. Examples of commercially available products are Licomont NaV 101 or Licomont CaV 102 from Clariant.

Other materials that can be added to the polymer powder in order to improve processibility or for further modification of the polymer powder are inorganic foreign pigments, e.g., transition metal oxides, stabilizers, e.g., phenols, in particular sterically hindered phenols, flow agents and powder-flow aids, e.g., fumed silicas, and also filler particles. The amount of these substances added to the polymers, based on the total weight of polymers in the polymer powder, is preferably such as to comply with the stated concentrations for fillers and/or auxiliaries for the inventive polymer powder.

The present invention provides processes for production of moldings via layer-by-layer processes in which regions of the respective layer are selectively melted, and in which a polyester powder is used, characterized in that it was prepared from a di- or polyhydric alcohol and from at least one dicarboxylic acid, while avoiding any aromatic monomer unit.

A diol having not more than 10 carbon units, and particularly preferably a diol having not more than 6 carbon units, and very particularly preferably butanediol, is preferred as monomer unit for the polyester powder in the inventive use.

A diacid having from 4 to 18 carbon atoms, particularly preferably from 4 to 12, and very particularly preferably from 6 to 8, is also preferred as monomer unit for the polyester powder in the inventive use.

However, no aromatic structure is ever used in preparation of the polyester powder.

The energy is introduced via electromagnetic radiation, and selectivity is achieved by way of example via a mask, application of an inhibitor, of an absorber, or of a susceptor, or else via focusing of the radiation, for example via a laser. The electromagnetic radiation encompasses the range from 100 nm to 10 cm, preferably from 400 nm to 10.6 µm, or from 800 nm to 1060 nm. The source of the radiation can by way of example be a microwave generator, a suitable laser, a radiant heater, or a lamp, or else combinations thereof. Once all of the layers have cooled, the inventive molding can be removed.

The following examples of these processes serve for illustration, with no intention to restrict the invention thereto.

Laser sintering processes are well known and are based on selective sintering of polymer particles, layers of polymer particles being briefly exposed to laser light and the polymer particles exposed to the laser light thus being bonded to one another. Successive sintering of layers of polymer particles produces three-dimensional objects. Details concerning the selective laser sintering process can be found by way of example in the U.S. Pat. No. 6,136,948 and WO 96/06881 both of which originate from PCT/US95/11006, which is hereby incorporated by reference.

Other processes with good suitability are the SIB process as described in U.S. Pat. No. 6,589,471, or a process as described in U.S. Pat. No. 6,531,086. Both processes operate with full-surface infrared heating to melt the powder. Selectivity of melting is achieved in the first process via application of an inhibitor, and in the second process via a mask. DE 103 11 438 discloses another process, in which the energy needed for melting is introduced via a microwave generator, and selectivity is achieved via application of a susceptor.

Other suitable processes are those which operate with an absorber, which is either present in the powder or is applied via ink jet methods, as described in DE 10 2004 012 682.8, DE 10 2004 012 683.6, and DE 10 2004 020 452.7.

A feature of the inventive moldings which are produced via a layer-by-layer process in which regions are selectively melted is that they comprise at least one polyester which was prepared from a di- or polyhydric alcohol and from a dicarboxylic acid, while avoiding any aromatic monomer unit.

A diol having not more than 10 carbon units, and particularly preferably a diol having not more than 6 carbon units, and very particularly preferably butanediol, is preferred as monomer unit for the polyester powder in the inventive molding.

A diacid having from 4 to 18 carbon atoms, particularly preferably from 4 to 12, and very particularly preferably from 6 to 8, is also preferred as monomer unit for the polyester powder in the inventive molding.

However, no aromatic structure is ever used in preparation of the polyester powder.

The moldings can moreover comprise fillers and/or auxiliaries (the statements made for the polymer powder being again applicable here), e.g., heat stabilizers, e.g., sterically hindered phenol derivatives. Examples of fillers are glass particles, ceramic particles, and also metal particles, e.g., iron shot, or corresponding hollow beads. The inventive moldings preferably comprise glass particles, very particularly preferably glass beads. Inventive moldings preferably comprise less than 3% by weight, particularly preferably from 0.001% by weight to 2% by weight, and very particularly preferably from 0.05% by weight to 1% by weight, of these auxiliaries, based on the entirety of the polymers present. Inventive moldings likewise preferably comprise less than 75% by weight, preferably from 0.001% by weight to 70% by weight, particularly preferably from 0.05% by weight to 50% by weight, and very particularly preferably from 0.5% by weight to 25% by weight, of these fillers, based on the entirety of the polymers present.

There are application sectors for these moldings in both rapid prototyping and rapid manufacturing. The latter certainly in small-run production, i.e., production of more than one identical part, but where production by means of an injection mold is not economic. Examples here are parts for high-specification cars of which only small numbers are produced, or replacement parts for motor sports, where the important factor is not only the small numbers of units but also the availability time. Industries using the inventive parts can be the aerospace industry, medical technology, mechanical engineering, automobile construction, the sports industry, the household goods industry, the electrical industry, and the lifestyle industry.

The examples below are intended to describe the polyester powder, and also its inventive use, but there is no intention that the invention be restricted to the examples.

The values measured for laser diffraction were obtained using a Malvern Mastersizer S, version 2.18. Bulk density was determined using an apparatus to DIN 53 466. BET surface area is determined via gas adsorption, using the Brunauer, Emmet and Teller principle; the standard utilized is DIN ISO 9277.

The present invention can be better understood by the following comparative and inventive examples, in which the latter are not meant to be limiting on the presently claimed invention.

EXAMPLES

Example 1

Polyester Composed of Hexanediol and Adipic Acid, 1:1

A polyester comprising equimolar parts of hexanediol and adipic acid was prepared by standard methods. The DIN 53728 viscosity number was 115 cm$^3$/g, and the DIN EN ISO 2114 acid number was 2 mg KOH/g, and the DIN 53 240-2 hydroxy number was 1 mg KOH/g. The glass transition was −60° C., and the melting point was 60° C.; both were determined by DIN 53765. The DIN ISO 1133 (21.6N) MFR value was 200 g/10 min. The polyester powder was prepared via low-temperature milling and subsequent fractionation. The powder thus obtained was modified with 0.1 part of Aerosil 200 in a Henschel mixer. Bulk density was 472 g/L. Grain size distribution was determined as follows: d10=10 μm, d50=60 μm, d90=122 μm.

Example 2

Polyester Composed of Succinic Acid and Butanediol, 1:1

A polyester comprising equimolar parts of butanediol and succinic acid is likewise prepared according to standard methods. The DIN 53728 viscosity number was 100 cm$^3$/g. The glass transition was 35° C., and the melting point was 115° C.; both were determined to DIN 53765. The DIN ISO 1133 (21.6N) MFR value was 200 g/10 min. The polyester powder was prepared via low-temperature milling and subsequent precautionary sieving. The powder thus obtained was modified with 0.1 part of Aerosil R812 in a Henschel mixer. Bulk density was 455 g/L. Grain size distribution was determined as follows: d10=9 μm, d50=61 μm, d90=105 μm.

Comparative Example 1

Nylon-12 Pellets 1000 g of laurolactam, 10.5 g of 1,12-dodecanedioic acid, 445 g of water, and 0.1 g of 50% strength aqueous hypophosphorous acid were heated under autogenous pressure (about 22 bar) to 280° C. in a 2 L stirred autoclave composed of V4A steel, and after 5 hours were depressurized within a period of 3 hours to atmospheric pressure. Nitrogen was passed over the melt for a further 2 hours. The reaction product was extruded, pelletized, and dried at 70° C. A polymer having the following properties was obtained.

| | |
|---|---|
| Relative solution viscosity | 1.62 |
| Extract content | 1.26% by weight |
| Melting point (DSC) | 177 C. |
| Enthalpy of fusion | 77 J/g |
| COOH | 119 mmol/kg |
| NH$_2$ | 6 mmol/kg |

400 g of the pellets were dissolved at 152° C. in 2.6 l of 96% ethanol denatured with 2-butanone in a 5 L stirred tank equipped with blade stirrer, the stirrer rotation rate being 160 rpm, and the mixture was kept at this temperature for 75 minutes. The contents of the tank were cooled within a period of 40 minutes to 110° C., and this temperature was maintained for 60 minutes. Evolution of heat, discernible via a rise of about 2 K in internal temperature, ceased after about 25 minutes. The suspension was cooled to 75° C. and transferred to a paddle dryer for drying (80° C., 3 hours).

This gave a powder with the following properties:

| | |
|---|---|
| Bulk density | 417 g/L |
| Grain size distribution (d10/d50/d90) | 43 μm/66 μm/89 μm |
| Melting point (DSC) | 186 C. |
| Enthalpy of fusion | 119 J/g |
| BET surface area | 6.8 m$^2$/g |
| LL content (GC) | 0.28% |

Comparative Example 2

Copolyester Composed of 25 Parts (42 mol %) of Terephthalic Acid, 25 Parts (58 mol %) of Isophthalic Acid, 45 Parts (100 mol %) of Butanediol, and 5 Parts (11 mol %) of Polyethylene Glycol The material is likewise prepared from the components indicated above according to standard methods. The glass transition was 10° C., and the melting point was 118° C.; both were determined to DIN 53765. The DIN ISO 1133 (21.6N) MFR value was 25 g/10 min. The copolyester powder was prepared via low-temperature milling and subsequent precautionary sieving. The powder thus obtained was modified with 0.1 part of Aerosil R812 in a Henschel mixer. Bulk density was 430 g/L. Grain size distribution was determined as follows: d10=5 μm, d50=70 μm, d90=110 μm.

Further Processing and Testing

The powders from the examples were used for construction of ISO 3167 multipurpose test specimens in a laser sintering machine. Mechanical properties of the latter components were determined by means of an EN ISO 527 tensile test (see Table 1). Each production process took place on an EOSINT P380 laser sintering machine from EOS GmbH. Layer thickness was about 0.15 mm. Density was determined by a simplified internal method. For this, the ISO 3167 tensile specimens (multipurpose test specimen) produced were measured and volume was thus calculated, the weight of the tensile specimens was determined, and density was calculated from volume and weight. Shrinkage was determined via the difference between required and actual dimensions of the molding. The processing temperature range was determined by utilizing the construction chamber temperatures, by taking as the lower construction temperature limit the temperature which just avoided any discernible warpage of the previously molten regions, and the upper processing temperature limit the temperature which just avoided any discernible skinning on the powder surface. By way of example, these studies were carried out in an EOSINT P380 laser sintering machine from EOS GmbH. In the inventive examples, the temperature of the process chamber was controlled to not more than 150° C.

TABLE 1

Results of Mechanical Tests on Moldings of the Examples

| Example | PT[a] [° C.] | MoE[b] [N/mm²] | TSB[c] [%] | Density[d] |
|---|---|---|---|---|
| Example 1 | 56° C. | 346 | 5.3 | 95% |
| Example 2 | 110° C. | 502 | 5.0 | 93% |
| Comparative Example 1 | 180–184 | 1700 | 17 | 95% |
| Comparative Example 2 | 90° C. | 87 | 9.2 | 83% |
| 60% of powder from Example 2 and 40% of glass beads (based on weight) | 111° C. | 980 | 3.7 | 92% |

[a]Processing temperature.
[b]Modulus of elasticity.
[c]Tensile strain at break.
[d]Density of inventively produced component, based on density of polymer.

The processing temperatures for production of identical-density components are markedly below that for nylon-12, currently the standard material produced. The mechanical properties of the components also have very good suitability for use in rapid prototyping. From Comparative Example 2 it can be seen that the individual powder particles undergo only incipient sintering, and do not bond with one another to give a dense molding on exposure to the electromagnetic energy. This has adverse effects in particular on modulus of elasticity, but also on the other mechanical properties. At densities less than 90% of the comparative densities of an injection-molded component, the strength of the components was mostly too low.

The present application is based on DE 10 2005 054 723.0, filed in the German Patent Office on Nov. 17, 2005, and is hereby incorporated by reference in its entirety.

The invention claimed is:

1. A layer-by-layer process for production of a three-dimensional component using a powder, which comprises:
    selectively melting regions of a powder layer by applying electromagnetic energy,
    wherein the powder comprises at least one polyester prepared by polycondensation of a di- or polyhydric aliphatic alcohol and of an aliphatic diacid,
    wherein
    the melt flow rate value of the polyester powder to ISO 1133 is from 50 g/10 min to 500 g/10 min,
    the melting point to DIN 53765 of the polyester powder is from 60° C. to 150° C.,
    the BET surface area of the polyester powder is less than 15 m²/g, and
    the median grain diameter of the polyester powder is from 40 µm to 120 µm.

2. A process according to claim 1, wherein the dihydric aliphatic alcohol comprises at most 10 carbon atoms.

3. A process according to claim 1, wherein the dihydric aliphatic alcohol comprises at most 6 carbon atoms.

4. A process according to claim 1, wherein the dihydric aliphatic alcohol comprises at most 4 carbon atoms.

5. A process according to claim 1, wherein the powder comprises at least one polyester prepared via polycondensation of an at least trihydric alcohol and of a diacid.

6. A process according to claim 1, wherein the aliphatic diacid comprises 4 to 18 carbon atoms.

7. A process according to claim 1, wherein the aliphatic diacid comprises 4 to 12 carbon atoms.

8. A process according to claim 1, wherein the aliphatic diacid comprises 6 to 8 carbon atoms.

9. A process according to claim 1, wherein the aliphatic diacid is a saturated diacid.

10. A process according to claim 1, wherein the powder comprises at least one polyester prepared via polycondensation of a polyglycol and of an aliphatic diacid.

11. A process according to claim 1, wherein selectivity occurs by application of a susceptor, of an inhibitor, or of an absorber, or a mask.

12. A process according to claim 1, wherein selectivity occurs by focusing of a laser beam.

13. A process according to claim 1, wherein the powder is obtained by milling.

14. A process according to claim 1, wherein the melt flow rate value of the polyester powder to ISO 1133 is from 100 to 300 g/10 min.

15. A process according to claim 1, wherein the melting point to DIN 53765 of the polyester powder is from 60° C. to 120° C.

16. A process according to claim 1, wherein the melting point to DIN 53765 of the polyester powder is from 60° C. to 100° C.

17. A process according to claim 1, wherein the BET surface area of the polyester powder is less than 10 m²/g.

* * * * *